(12) United States Patent
Shimelmitz et al.

(10) Patent No.: US 6,898,213 B1
(45) Date of Patent: May 24, 2005

(54) CIRCUIT EMULATION SERVICE (CES) OVER IP

(75) Inventors: Alik Shimelmitz, Rishon Lezion (IL); Israel Sasson, Bnei Berak (IL); Gil Biran, Raananna (IL)

(73) Assignee: IPRAD Ltd., Tel Aviv (IL)

( * ) Notice: Subject to any disclaimer, the term of this patent is extended or adjusted under 35 U.S.C. 154(b) by 838 days.

(21) Appl. No.: 09/690,077

(22) Filed: Oct. 16, 2000

(51) Int. Cl.⁷ .................................................. H04J 3/22
(52) U.S. Cl. ..................................................... 370/537
(58) Field of Search ........................ 370/241, 465–466, 370/473–474, 537, 352, 509, 469, 395.5, 400, 401, 353, 356, 389, 522; 709/239

(56) References Cited

U.S. PATENT DOCUMENTS

| 5,274,635 | A | | 12/1993 | Rahman et al. | |
|---|---|---|---|---|---|
| 5,486,864 | A | | 1/1996 | Zdepski | |
| 5,844,891 | A | | 12/1998 | Cox | |
| 5,931,916 | A | * | 8/1999 | Barker et al. | 709/239 |
| 5,987,030 | A | | 11/1999 | Brockhage et al. | |
| RE36,633 | E | | 3/2000 | Fleischer et al. | |
| 6,104,702 | A | * | 8/2000 | Vissers | 370/241 |
| 6,272,128 | B1 | * | 8/2001 | Pierson, Jr. | 370/352 |
| 6,459,708 | B1 | * | 10/2002 | Cox et al. | 370/537 |
| 6,782,007 | B1 | * | 8/2004 | Redman | 370/509 |

FOREIGN PATENT DOCUMENTS

| EP | 0722237 A1 | 7/1996 |
|---|---|---|
| WO | WO 99/38285 | 7/1999 |
| WO | WO 00/05917 | 2/2000 |

OTHER PUBLICATIONS

Douglas E. Comer, InternetWorking with TCP/IP Principles, Protocols, and Architectures, Prentice Hall, 1995, Fourth Edition pp. 98, 197–206, & 539–551.*

* cited by examiner

*Primary Examiner*—Kenneth Vanderpuye
(74) *Attorney, Agent, or Firm*—Katten Muchin Zavis Rosenman

(57) ABSTRACT

Streams of data including explicit synchronization patterns (such as entire T1/E1) are transmitted utilizing an unstructured data format, while streams not containing explicit synchronization patterns (such as fractional T1/E1) are sent utilizing a structured data format, i.e., the data structure itself provides for circuit alignment at the receiving end. In addition, SDH VC-12 frames are transmitted over the IP network by encapsulating the entire frame (payload and overhead) into an RTP packet. Furthermore, the clock is reconstructed (clock recovery) from the packet stream at the receiver's side.

5 Claims, 19 Drawing Sheets

| Byte 1, First TS | Byte 1, Second TS | Byte 1, Third TS | | Byte 1, m TS |
|---|---|---|---|---|
| Byte 2, First TS | Byte 2, Second TS | Byte 2, Third TS | | Byte 2, m TS |
| Byte 3, First TS | Byte 3, Second TS | Byte 3, Third TS | | Byte 3, m TS |
| Byte 4, First TS | Byte 4, Second TS | Byte 4, Third TS | | Byte 4, m TS |
| Byte 5, First TS | Byte 5, Second TS | Byte 5, Third TS | | Byte 5, m TS |
| | | | | |
| Byte n, First TS | Byte n, Second TS | Byte n, Third TS | | Byte n, m TS |

Figure 9

CIRCUIT EMULATION SERVICE (CES) OVER IP

BACKGROUND OF THE INVENTION

1. Field of Invention

The present invention relates generally to the field of communications. More specifically, the present invention is related to a system and method for circuit emulation service (CES) over IP.

2. Discussion of Prior Art

There are a variety of communicating means associated with networks today including, but not limited to: T1, T3, E1, or E3. A brief description of each of the following is given below:

T1: A dedicated network connection supporting data rates of 1.544 Mbits per second. A T-1 line actually consists of 24 individual channels, each of which supports 64 Kbits per second. Each 64 Kbit/second channel can be configured to carry voice or data traffic. Network companies lease out some of these individual channels, and this network connection is known as fractional T-1 access. T-1 lines are sometimes referred to as DS1 lines.

T3: A dedicated network connection supporting data rates of about 43 Mbps. A T-3 line actually consists of 672 individual channels, each of which supports 64 Kbps. T-3 lines are sometimes referred to as DS3 lines.

E1: Similar to the North American T-1, E1 is the European format for digital transmission. E1 carries signals at 2.048 Mbps (32 channels at 64 Kbps), versus the T1, which carries signals at 1.544 Mbps (24 channels at 64 Kbps).

E3: European digital signal 3 is another European format for digital transmission. E3 carries 34.368 Mbps with about 480 channels.

The present communications revolution has focused on the Internet and World Wide Web (WWW) with emphasis on the Internet protocol (IP). The high-speed IP-based networks based on connections described above are the latest innovation in the world of communications. The capacity of these networks is increasing at a prodigious rate, fueled by the popularity of the Internet and decreasing costs associated with the technology.

Circuit emulation over IP permits mapping of T1/E1 traffic (as well as a variety of other constant bit rate digital signals traffic) onto IP packets to be transported over a backbone IP network (like the Ethernet). None of the systems available today, however, teach a viable solution to handling circuit emulation service (CES) over Internet Protocol (IP).

Each of the below-described references teaches methods of circuit data transmission in prior art communication systems. However, none of the references provide or suggest the present invention method of circuit emulation service over IP.

U.S. Pat. No. 5,274,635 discloses a method for circuit alignment when circuit data is transmitted over a cell-based network. The data contained in the cells is arranged in either a bit-skewed arrangement or byte-skewed arrangement dependent on whether or not the data is simple DS0 data or bundled DS0 data. The skewed arrangements are utilized in conjunction with an alignment bit in the header, which is set when the cell contains an aligned timeslot, to provide circuit alignment. IP networks do not appear to be explicitly disclosed.

U.S. Pat. No. 5,987,030 describes a system that utilizes frame count values and two offset values placed in the header to recreate temporal locations of circuit data transmitted over a packet network. IP networks do not appear to be explicitly disclosed.

The European patent EP0722237A1 describes in the background, the transmission of an entire frame including the synchronization channel over a packet network to correctly position circuits when all of the incoming circuits are to be transported to the same destination. Further, the disclosure of the reference teaches forming a packet for transporting circuit data (full or partial frames) over a packet network by placing the first byte into the packet from the lowest number slot of the frame, the next packet from the next lowest slot, etc. This is repeated across frames until the packet is filled. In this manner, when the bytes are read out, the first byte is placed into the lowest numbered slot in the outgoing frame, the next byte is placed in the next lowest numbered frame, etc. IP networks do not appear to be explicitly disclosed.

Whatever the precise merits, features and advantages of the above cited references, none of them achieve or fulfills the purposes of the present invention. These and other objects are achieved by the detailed description that follows.

SUMMARY OF THE INVENTION

A method of providing circuit emulation service over IP networks in which streams including explicit synchronization patterns (such as entire T1/E1) are transmitted utilizing an unstructured data format, while streams not containing explicit synchronization patterns (such as fractional T1/E1) are sent utilizing a structured data format, i.e., the data structure itself provides for circuit alignment at the receiving end. In addition, SDH VC-12 frames are transmitted over the IP network by encapsulating the entire frame (payload and overhead) into an RTP packet. Also described is a mechanism to reconstruct clock (clock recovery) from the packet stream at the receiver's side.

BRIEF DESCRIPTION OF THE DRAWINGS

FIG. 9 illustrates the data format associated with the method in FIG. 8b.

DESCRIPTION OF THE PREFERRED EMBODIMENTS

Figure 1:
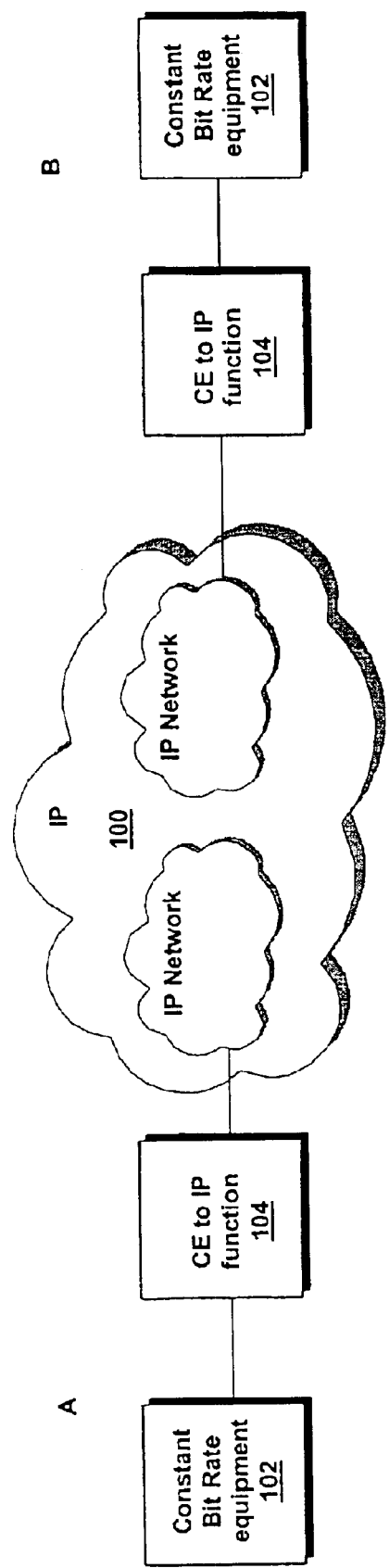
FIG. 1 illustrates circuit emulation services support on an IP-based interface.

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications of the materials for its construction and is not intended to limit the invention to the embodiment illustrated. Those skilled in the art will envision many other possible variations within the scope of the present invention.

In a world were the structure of backbone networks is based on IP technology there is a need for Circuit Emulation Service over IP (CESoIP). The method and system of the present invention implements transference of entire T3, E3, T1, E1 and VC12 over IP networks, as well as transference of fractional T1/E1 or any group of time slots over IP networks. The present invention also includes a mechanism to reconstruct clock (Clock Recovery) from the packet stream at the receiver side.

FIG. 1 describes the present invention's basic circuit emulation services over IP. To support CE there is a need to keep the data and the clock synchronization between the end points (A and B); i.e., both data and clock have to be transferred over an IP network 100. This is accomplished by the CE-to-IP inter-working function on both ends of the network and CE-to-IP function 104 then transforms the stream of data into packets to be transferred via the IP network.

Furthermore, the data to be transferred over the network is one of the following: structured or unstructured data; and clock synchronization transfer is one of the following ways: inbound or out-of-bound.

Figure 2:
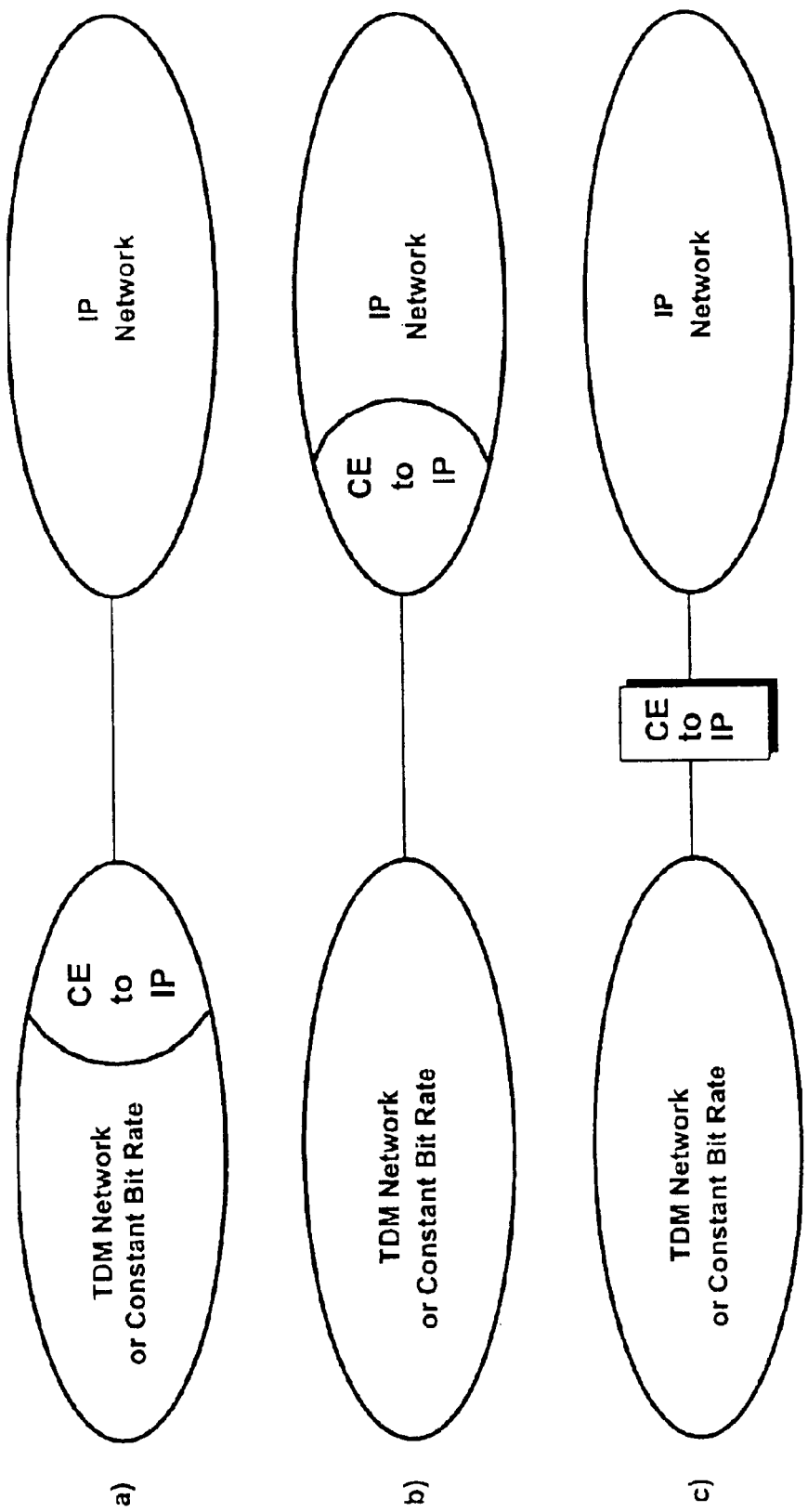
FIG. 2 illustrates examples of realizations of circuit emulation to IP functions that are equivalent.

FIGS. 2a–c illustrates three possible locations to implement a CE to IP inter-working function receiving TDM or other constant bit rate data. FIG. 2a illustrates one embodiment in which the CE-to-IP function is a part of the TDM/constant bit rate network. FIG. 2b illustrates yet another embodiment wherein the CE-to-IP function is a part of the transmitting IP network. FIG. 2c illustrates another embodiment in which the CE-to-IP function is neither associated with the TDM/constant bit rate network or the IP network.

Figure 3:
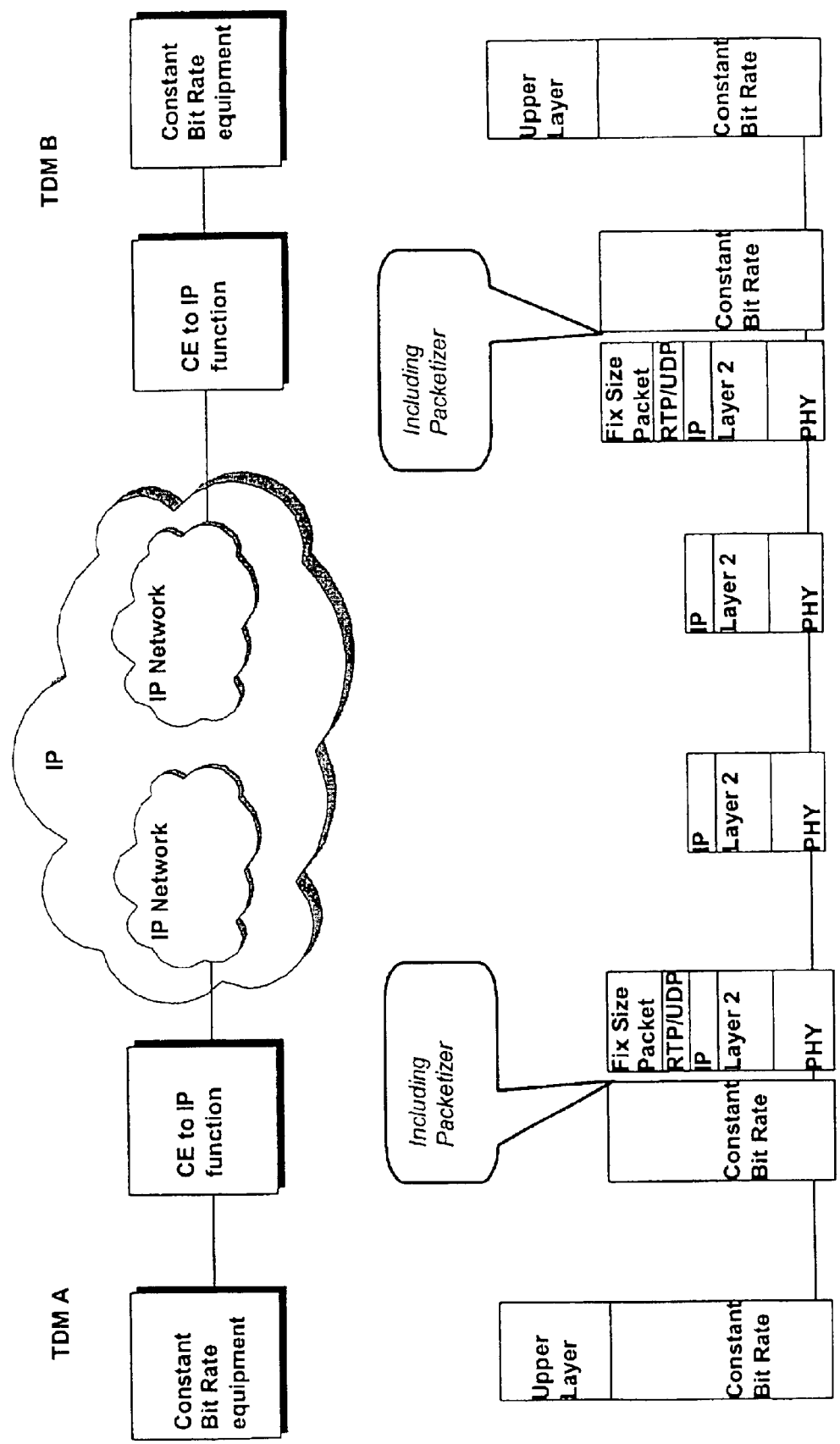
FIG. 3 illustrates a detailed overview of the method of circuit emulation over IP.

FIG. 3 illustrates a detailed description of the general method outlined in FIG. 1. The circuit data (can be TDM) enters into the CE-to-P function as a bit stream. The CE-to-IP function does not have to be familiar with the data format. The CE-to-IP function packs the data into packets with a predefined size, encapsulates them with RTP/UDP/IP headers, accomplishes appropriate layer 2 header and transfers packet over IP network. Thus, information can run on every network that IP can be carried on, for example: Ethernet (in this case the layer 2 is the MAC), Frame relay, PPP, POS (packet over sonet), and so on.

At the receiving side the CE to IP receives IP packet from layer 2 (i.e., layer 2 header is removed), removes the RTP/UDP/IP and generates a constant bit rate (CBR) stream from the data arriving in the packets.

Data to be transmitted is classified under one of the following types:

Structured—entering CBR stream has specific format that should be kept while transferring data over IP network.

In this case, CE-to-IP function is familiar with the data format and performs packetization in a way that allows the receiver side to keep synchronization and reconstruct the original data format. This mode is usually used to transfer some TS from T1/E1 link or fractional T1/E1.

Unstructured—CE-to-IP function transfers CBR stream transparently and does not implement any special algorithm to keep format of the stream over IP network. Usually unstructured transfer is implemented when CBR stream contains synchronization patterns explicitly, e.g. transfer of entire E1.

Figure 4:
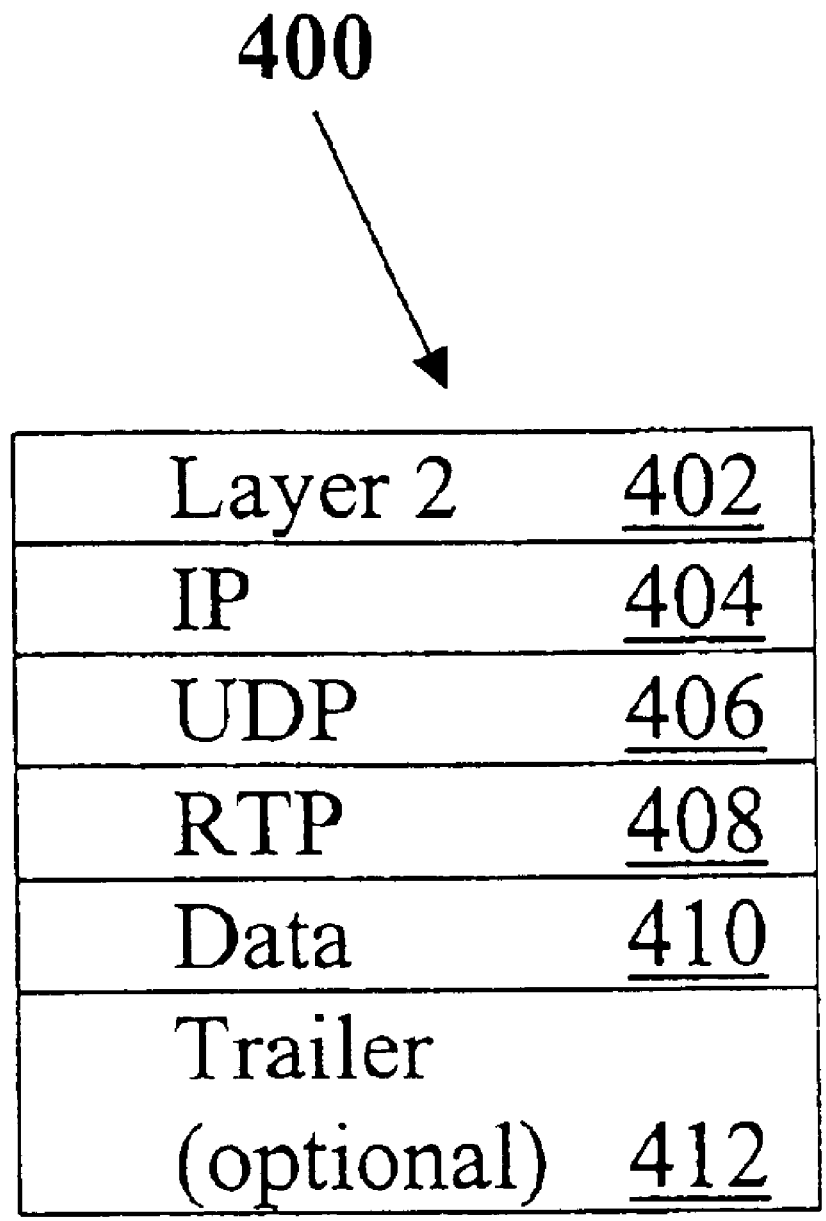
FIG. 4 illustrates general packet format.

SDH VC—Transferring a virtual container over an IP network. A VC is the information structure used to support path layer connections in the SDH. It consists of information payload and Path Overhead (POH) information fields organized in a block frame structure that repeats every 125 or 500 $\mu$s. Alignment information to identify VC-n frame start is provided by the server network layer. There are two types of virtual containers—lower order VC-n and higher order VC-n. Lower order VC-n comprises a single Container-n (n=1, 2, 3) plus the lower order VC POH appropriate to that level. Higher order VC-n (n=3, 4) comprises either a single Container-n or an assembly of Tributary Unit Groups (TUG-2s or TUG-3s), together with Virtual Container POH appropriate to that level. FIG. 4 describes a general format of a packet. Packet 400 comprises layer 2 header 402, IP header 404, UDP header 406, and RTP header 408, data information 410, and optional trailer (CRC) 412. Layer 2 header 402 of the packet 400 is a data-link layer based on the OSI reference model. Layer 2 is responsible for determining how physical layer (transmission media) is shared. The packet size can be configured to be between 40 to 1500 depending on the delay required and the performance of the network although alternative sizes are not within the scope of the invention. Small packet size will decrease the delay while big packet size will decrease the overhead of the encapsulate protocol.

Figure 5:
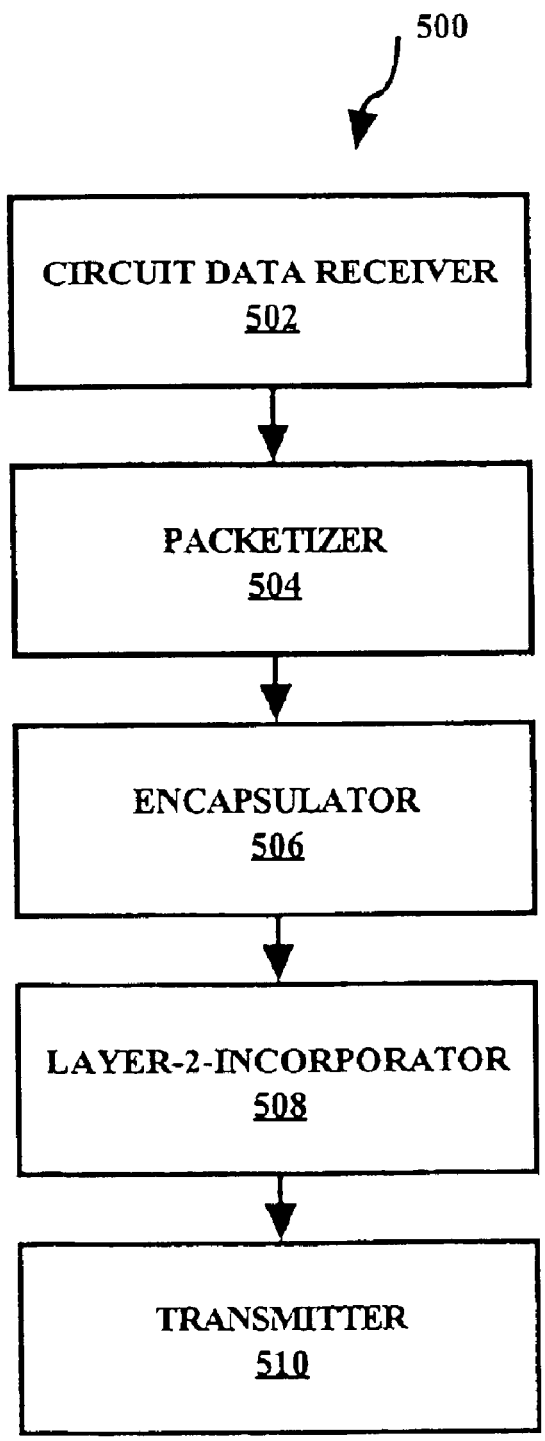
FIG. 5 illustrates the system described in FIG. 3.

FIG. 5 illustrates the system for the method described in FIG. 3. Circuit data receiver 502 receives the circuit data (e.g., TDM or other CBR data) and passes the data to packetizer 504, which packs the data into packets of predetermined sizes. Next, encapsulator 506 encapsulates the data packets with RTP/UDP/IP headers. Layer-2-operator 508 then accomplishes the necessary layer 2 operations and passes the packets to the transmitter 510 to transfer the packets over an IP network.

Unstructured data transfer mode is used to transfer data transparently over the IP network. The synchronization information (pattern) is contained inside the stream (and not derived from its structure). Thus transferring of this information does not require introducing any special packet data structure (format), the synchronization information is transferred as part of the data. This mode is usually used to transfer Constant Bit Rate line (for example: entire T1/E1 including the framing bit, n×64 k Leased Line, etc.) The Constant Bit Rate data is packed into pre-configured size packets encapsulated with RTP/UDP/IP and transmitted over IP network. Byte alignment is kept if the packetizer supports it.

Figure 6:
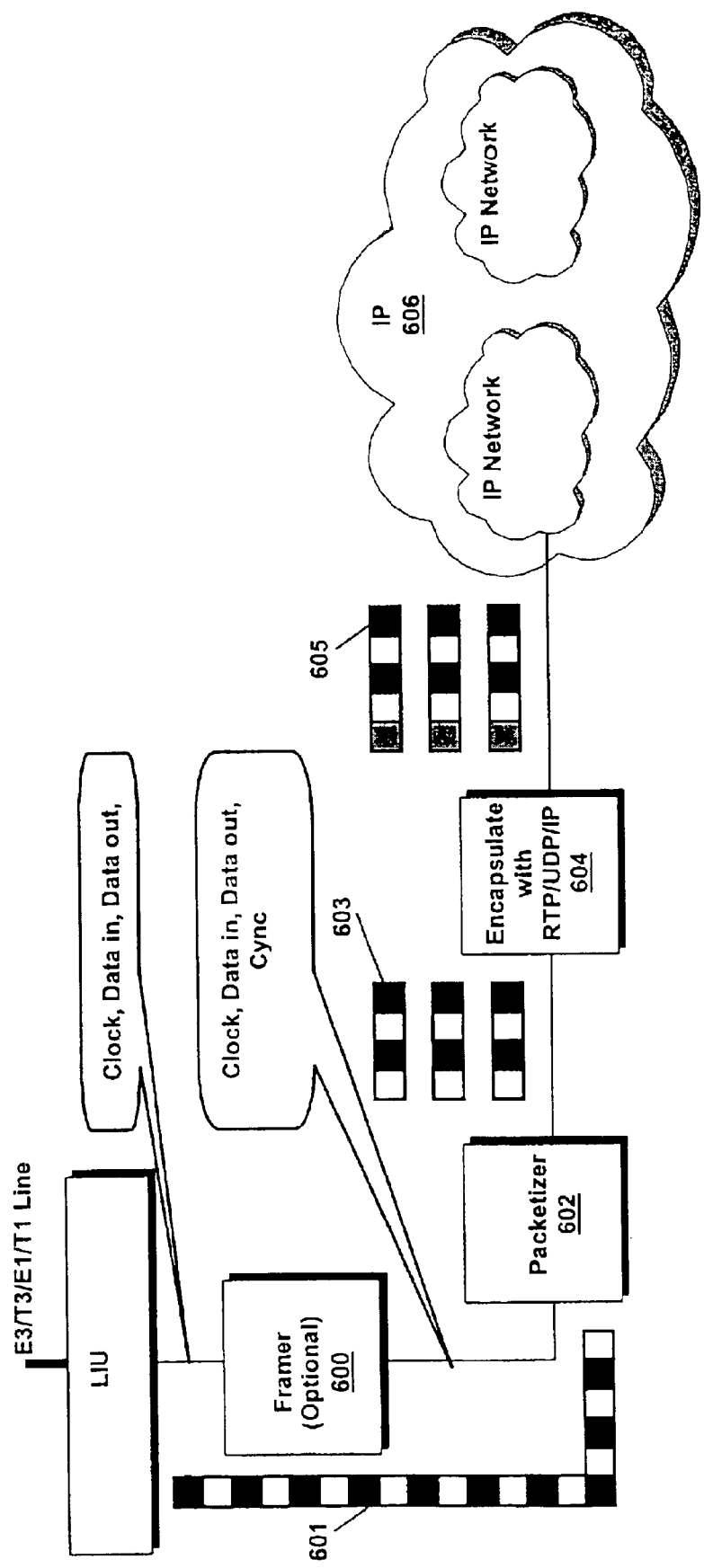
FIG. 6 illustrates circuit emulation to IP function in case of full T1, E1, T3, or E3 transfer over IP network.
Figure 7:
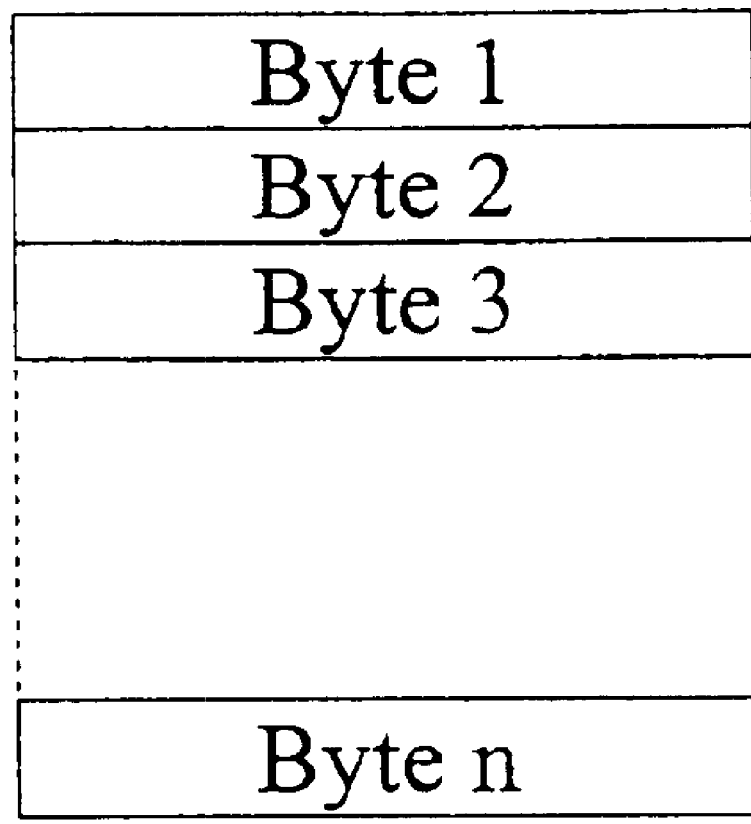
FIG. 7 illustrates data format in the method described in FIG. 6.

FIG. 6 illustrates the CE-to-IP function in the case of full T1, E1, T3, or E3 transfer over an IP network (this is an example of an unstructured data transfer). The data 601 reaches packetizer 602 where it is broken down into packets 603. Next, the packets are encapsulated with RTP/UDP/IP headers via encapsulator 604. The encapsulated data 605 is then transmitted via IP network 606. In this case, the framer component 600 is optional and the CE-to-IP function can work without it. The synchronization information is transferred as a part of the data; the receiving side uses it for synchronization. Each packet contains n bytes of data (n is configured by user) as illustrated by FIG. 7. The data is neither organized into any structure nor byte aligned.

Figure 8A:
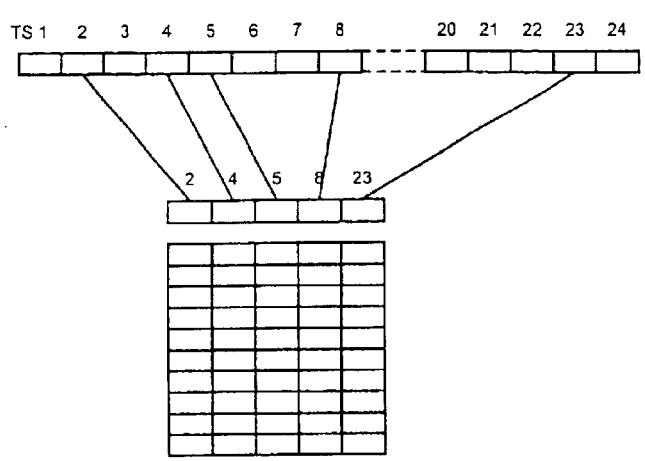
FIG. 8a illustrates the method of collecting the relevant TS's from each frame
Figure 8A:
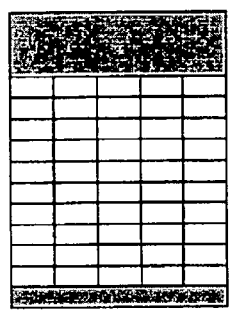
Figure 8B:
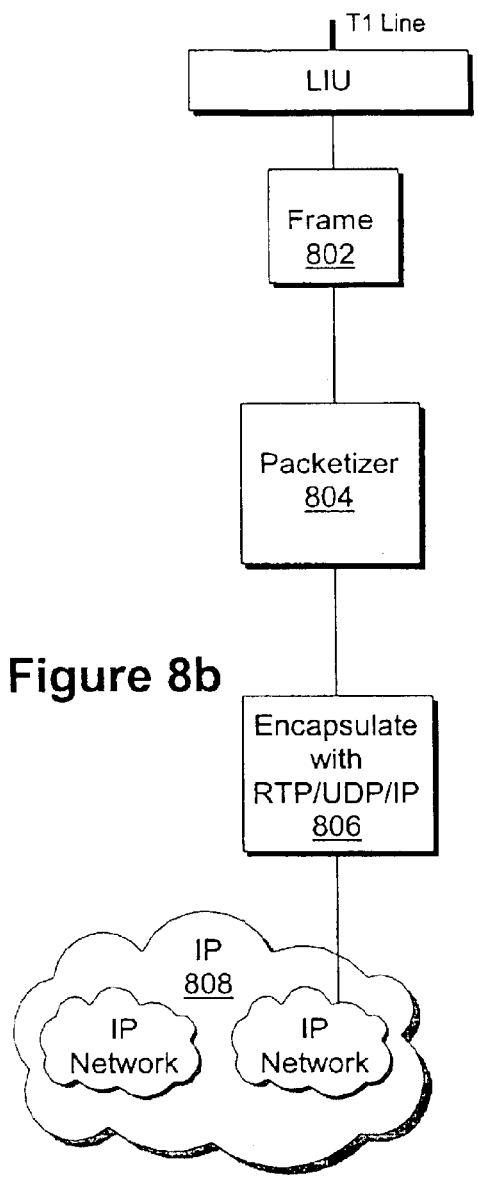
FIG. 8b illustrates the method of the present invention for structured data transfer.

In FIGS. 8a and 8b illustrate collectively, an example of structured data transfer, the CE-to-IP function in the case of fractional T1 transfer over IP network. Packetizer 804 collects relevant time slots (TSs) from each TDM frame and packs them into the packet. Time Slot or TS or DS0 in a T1/E1 frame is well known. It is 8 bits of data (1 byte). Each TS carries 64 Kb/s data. The size of the packet is aligned with the number of TSs sent in this connection. The packet is encapsulated 806 with RTP/UDP/IP/Layer-2 and sent over IP network 808. On the receiving side, the received network packet "goes up" through the layer 2 and the IP/UDP/RTP layers. Then, the extracted data is sent to the TDM line in the same order it was packed (the byte of the first TS sent to the first TS). Framer 802 indicates the beginning of a TDM frame to the packetizer (or de-packetizer) 804.

The data format of a structured data transfer is illustrated in FIG. 9. The size of data (in the packet) is calculated as m*n, where m is the number of TS in the defined connection and n is the number of bytes per TS per packet. This structure is known to both transmitting and receiving sides, and is used by the CE-to-IP function to insert/extract the data of a specific TS to/from the packet. Thus, sync is achieved both per TS and per bundle—no additional data is required (no overhead).

Figure 10:
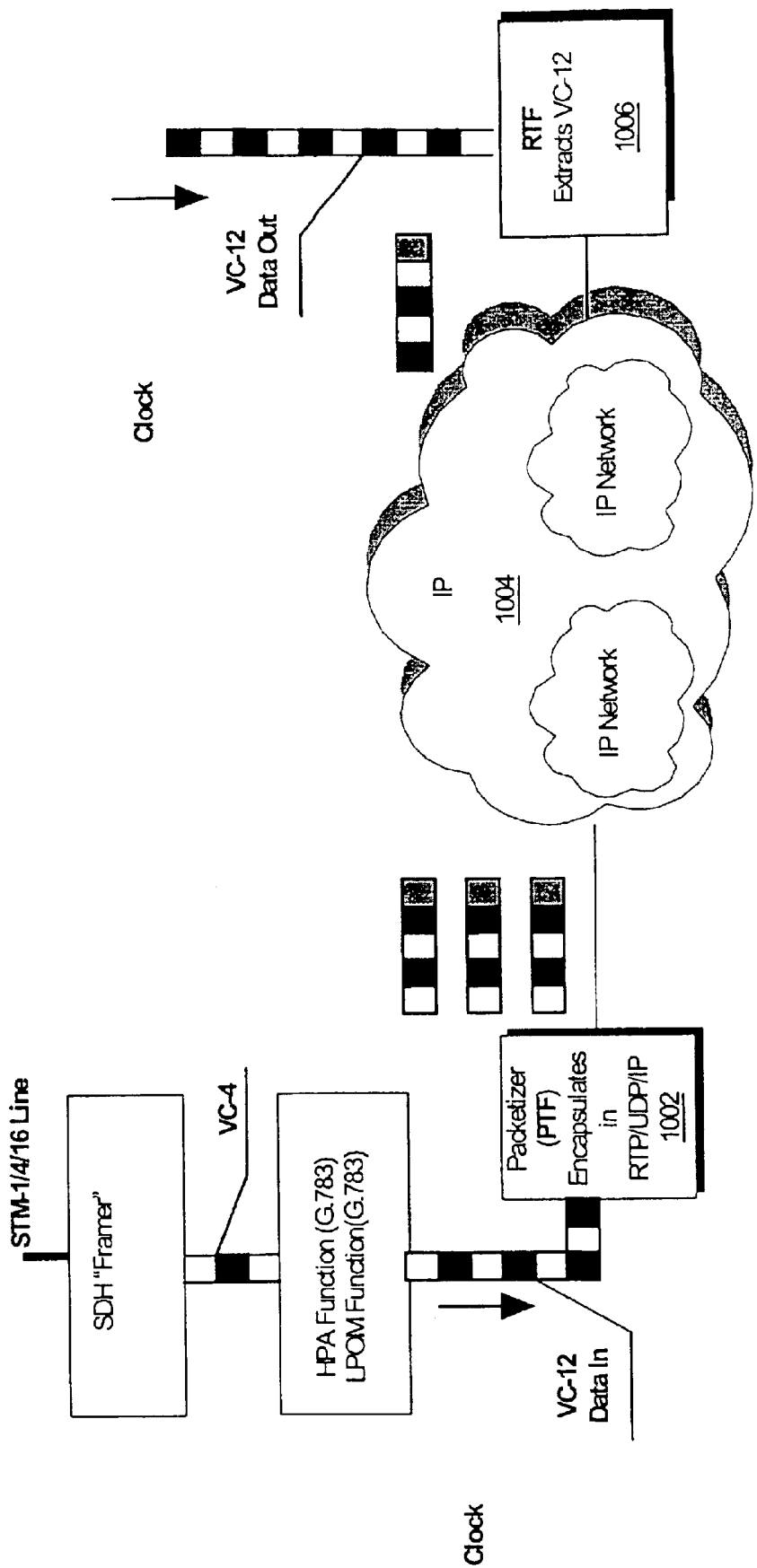
FIG. 10 illustrates the method for transfer of virtual container-12 over IP network.
Figure 11:
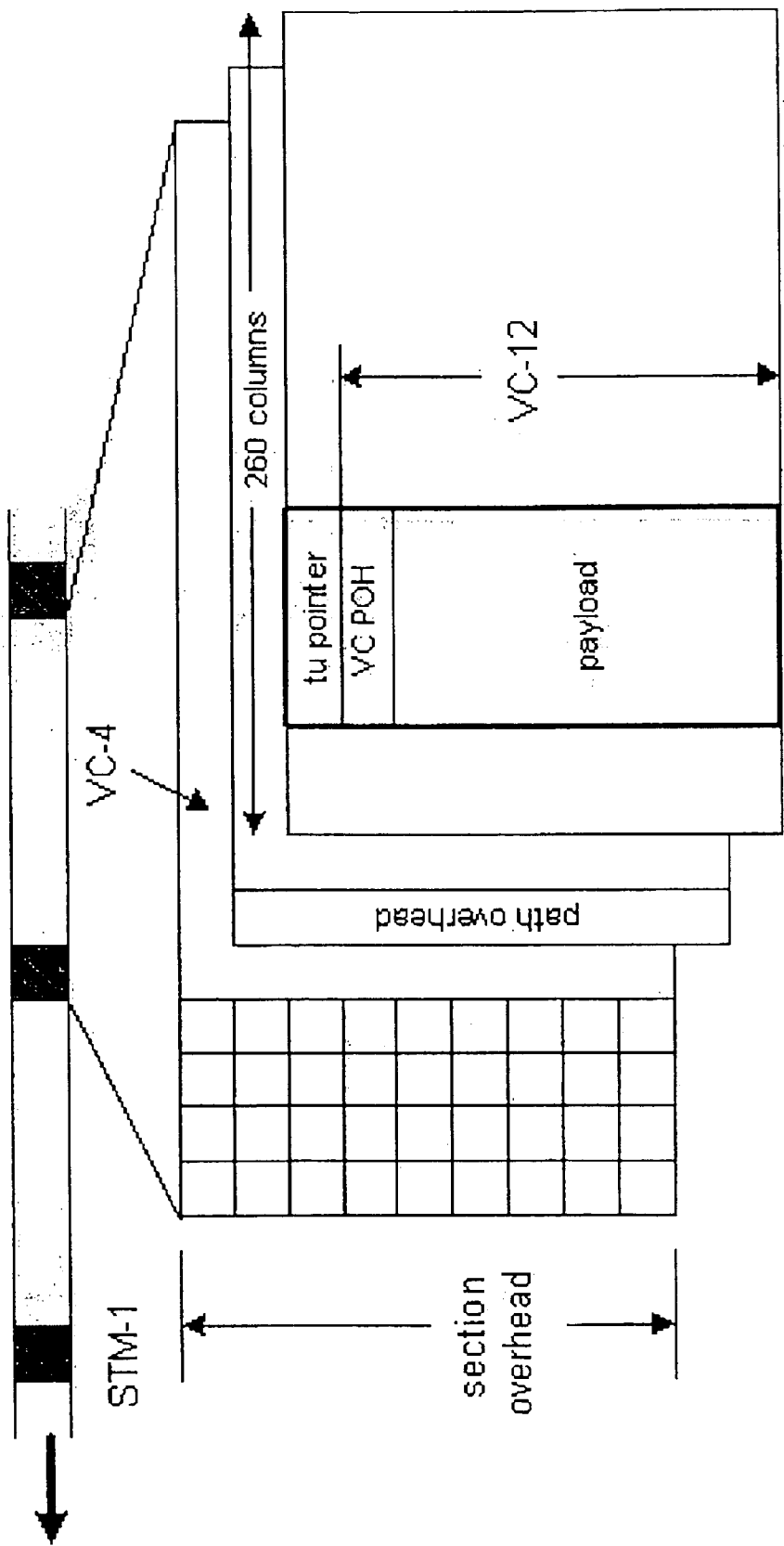
FIG. 11 illustrates a virtual container-12 frame structure.

FIG. 10 illustrates transfer of a virtual container (in this case, VC-12 over IP). Packetizer 1002, and the packet transmit function, encapsulates one or a few consecutive frames of VC-12 (payload with overhead) into RTP packets and sends it over IP network 1004. VC-12 frame includes both payload and overhead. Size of the frame is a multiply of 140 bytes, size of one container. The number of VC-12 frames packed into one packet is configurable and allows controlling the delay introduced by packetization versus overhead caused by encapsulation into IP/UDP/RTP. By default, single VC-12 container is encapsulated into a single RTP packet. At the receiver side, the VC-12 frames are extracted 1006 from the packet data. In a SDH network, TU-12 carries VC-12 and its (TU-12) frame structure is distributed over 4 consecutive VC-4 frames. FIG. 11 illustrates the basic SDH frame structure.

The packet transform (PTF) function operates in one of 3 modes:
  Regular—When HPA function detects LOP or AIS condition, no data packets are generated by PTF. PTF continues to increment the RTP sequence number each time it is supposed to generate a data packet. This allows PRF to recognize error conditions and duration and to generate an AIS signal on the receiving side. PTF & PRF functions maintain statistics that allow management station to calculate errors introduced by the IP network.
  Maintenance—It is possible to activate PTF-RTF signaling. In this mode, PTF generates a special control packet when HPA detects an error. The control packet (encapsulated in IP/UDP/RTP packet) carries the detected fault condition and RTP sequence number of the last packet generated by PTF. The control packet is generated periodically, once in a few seconds (configurable), until the error condition disappears. This allows PRF to differentiate between failures received at the entry into IP network and failures introduced by the IP network itself.
  Transparent—PTF ignores HPA indications and transfers all data transparently.

The "packet receive" function or PRF detects the following errors:
  Packet LOS—detected upon loss or reception of erroneous UDP/RTP packet (e.g., UDP checksum error). Two counters are maintained by PRF and incremented each time when an error condition occurs: packet loss counter is incremented by one and IP BE (block error) counter is incremented in accordance with the number of VC-12 frames packed into a single RTP packet.
  LOS—loss of 3 consecutive VC-12 frames.
  LOP—wrong size of received data packet.
  AIS (maintenance mode only)—upon reception of control packet.

PRF performance monitoring (PM) function is activated. PRF PM considers VC-12 frame as a single block (1120 bits). It uses IP BE counter and detected errors conditions to calculate ES, SES and UAS as defined in G.826.

PRF "tandem connection monitoring" is activated in a maintenance mode. In this mode AIS controlled packets are considered as normal packets and are not included into a calculation of error seconds. Thus, PM in this mode presents the quality of IP segment of the entire traffic path.

As mentioned earlier, the clock recovery function is an important feature of the present invention, since it helps in synchronization during data transfer.

Figure 12:
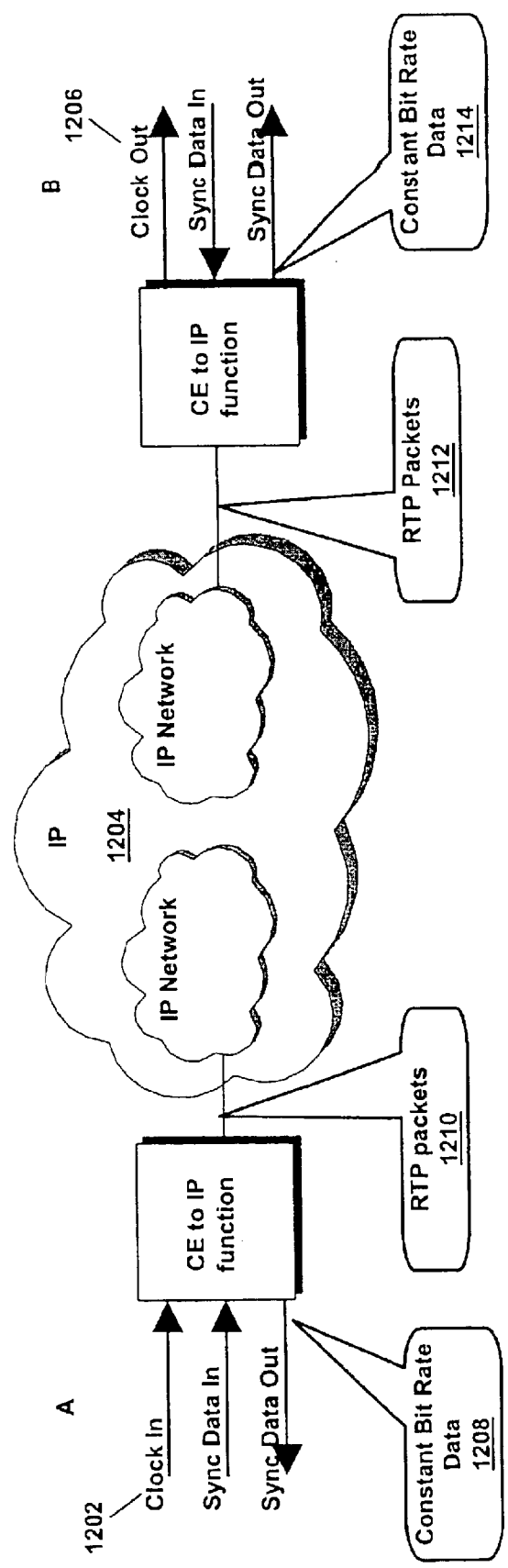
FIG. 12 illustrates the method of clock recovery over IP network.

The clock recovery function is used to get over (overpower) drift and wonder between the source clock and the receive clock (the jitter and the high frequency wonder are removed by using two unlocked clocks). To calculate the difference between the two clocks the clock recovery function has to get over the Packet Delay Variation (PDV) of the network. The function recovers clock only from the information carried within RTP header, no additional information needs to be sent across the network. FIG. 12 illustrates an example of transferring constant bit rate data 1208, 1214 over an IP network 1204 using RTP packets 1210, 1212. The clock that "enters" at the side A 1202 is recovered at side B 1206. In the example above, the "receive" and the "transmit" operations at both ends are synchronized. It is also possible to synchronize data out at the B side with data in at the A and vice versa. In this case each side transmits data into the TDM network with the clock recovered from the received RTP packets 1210, 1212.

Figure 13:
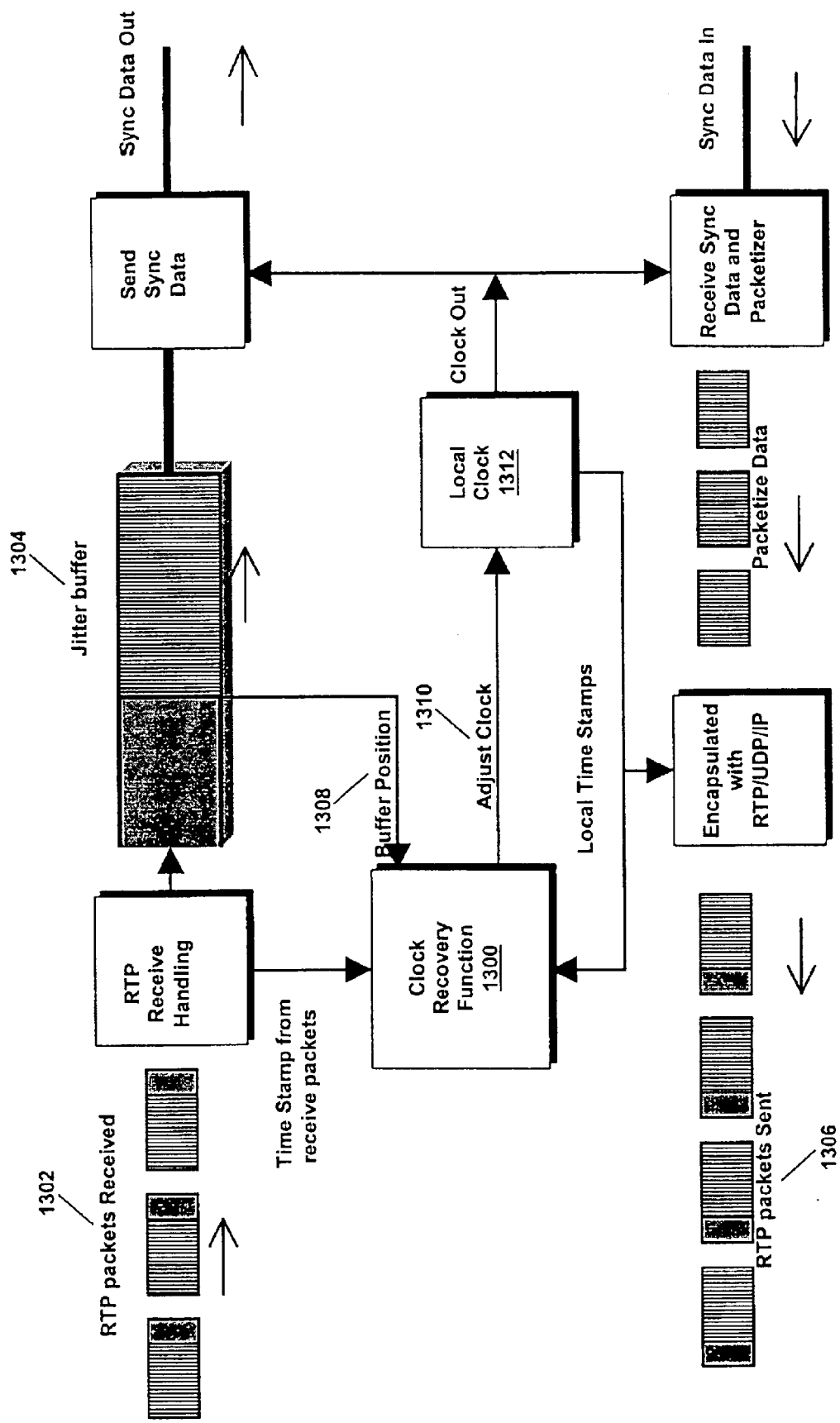
FIG. 13 illustrates the clock recovery function in the circuit emulation to IP network.

FIG. 13 illustrates the clock recovery function in the CE to IP. To control the receiver clock, the clock recovery algorithm 1300 utilizes two types of adjustments based on:
  Received time stamp of the RTP packets 1302
  Position of data in the jitter buffer 1304.

CE over IP connection operates with the fixed size packet; therefore difference between time stamps of any two RTP packets can be calculated by multiplying the difference between the RTP synchronization numbers and the number of clock pulses (bits) per packet. This difference will be referred to as the expected delta time.

If there is no drift between the clocks and there is no jitter from the network (PDV of the network is zero), the difference between the time stamp in RTP packets and time measured at the packet reception is constant. This difference is referred to as the relative receive time. Without PDV, the drift is calculated as the difference between two relative receive times divided by the expected delta time. To get over the PDV, a window-based algorithm is introduced as described below.

Figure 14:
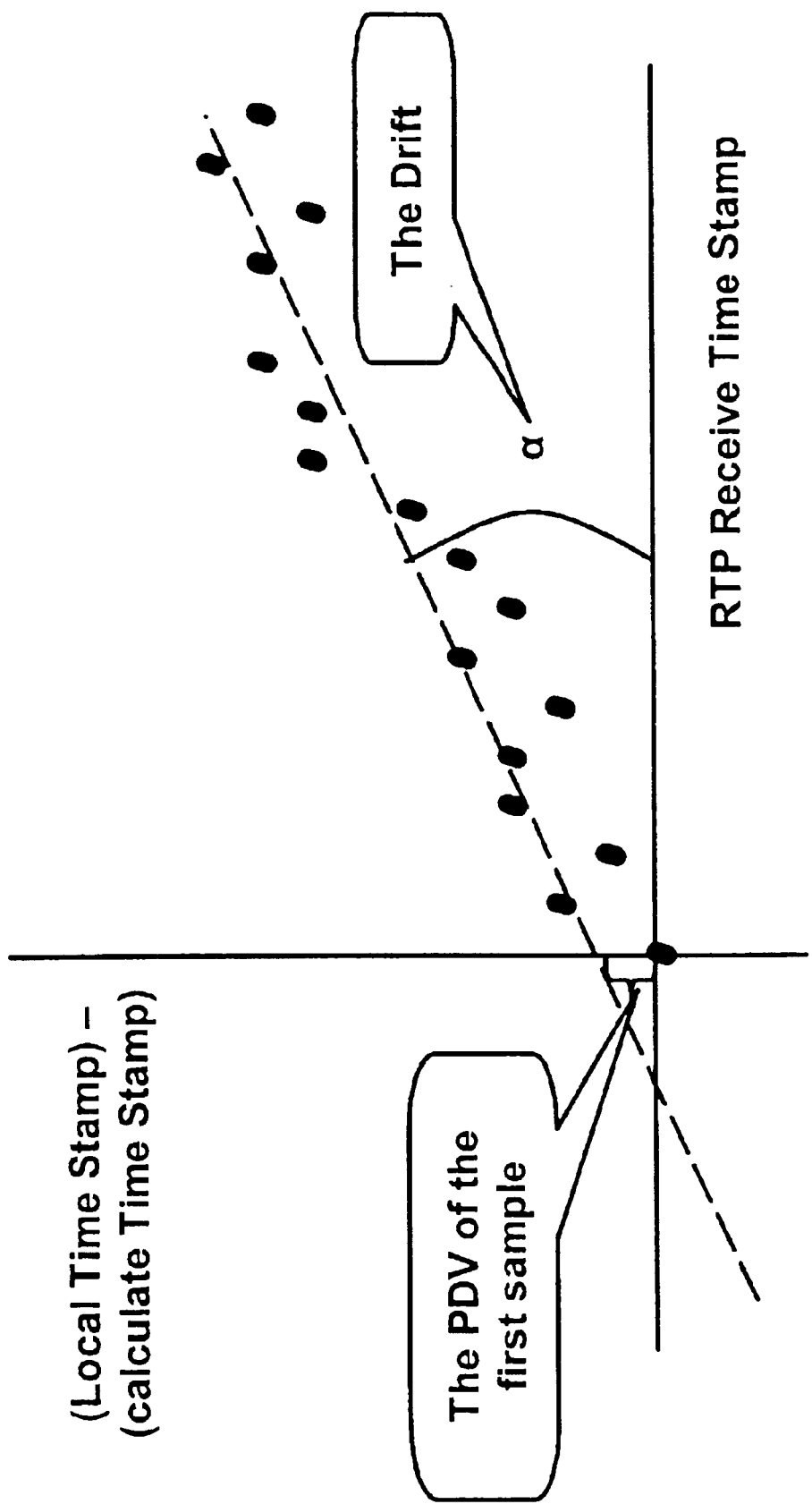
FIG. 14 illustrates measured time stamps with calculated time stamps (where drift >PDV).

FIG. 14 illustrates the scenario when in the used window the drift is significantly bigger then the PDV. In this case, the drift calculation is done using a linear regression function that "filters out" errors introduced by PDV. Theoretically, if the window size is big enough, every drift, no matter how small it is, can be calculated. Practically, the window size is limited. A bigger window also introduces a bigger buffer that increases the delay, and a bigger buffer decreases quality of the connection.

Figure 15:
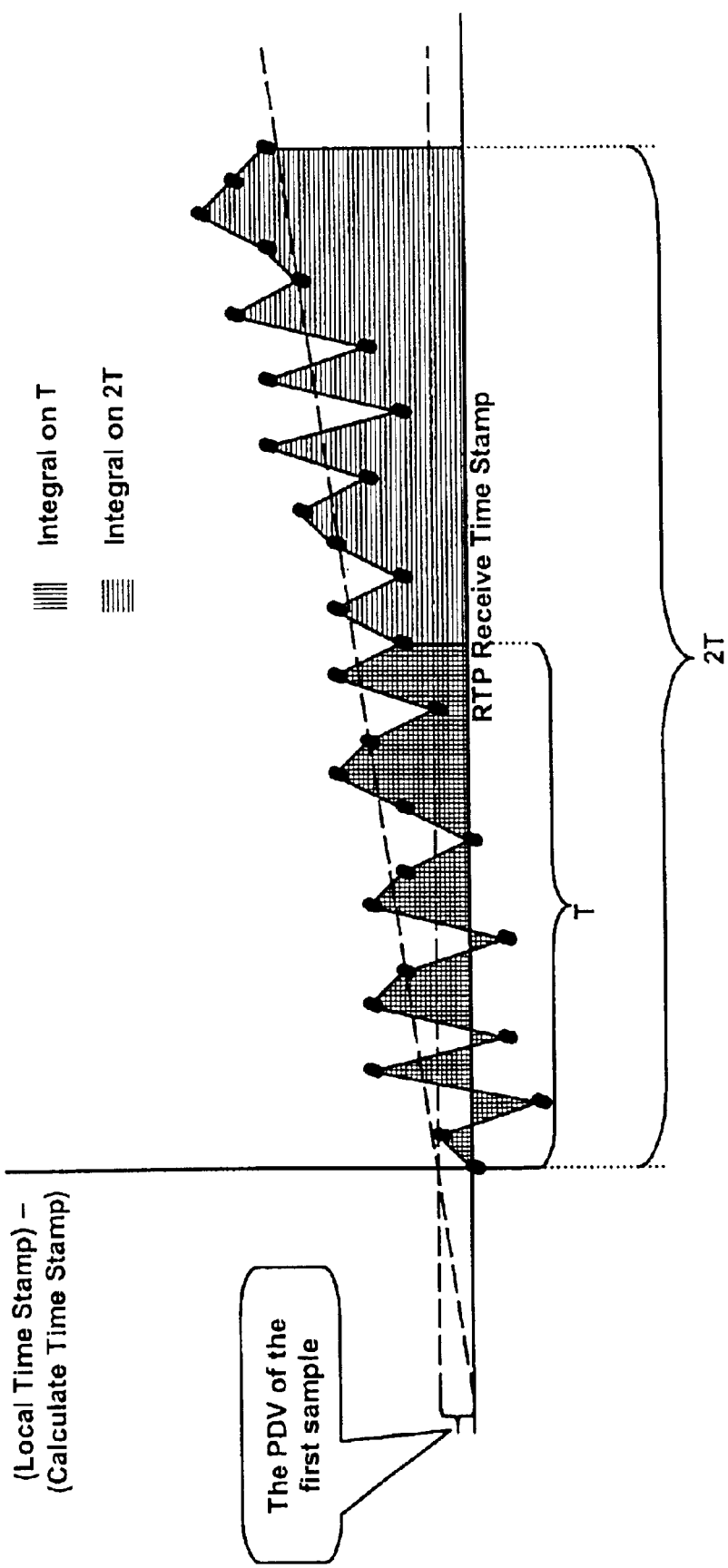
FIG. 15 illustrates the method for determination of window size.

In other words, on the one hand a bigger window is required to do more accurate clock recovery calculations and on the other hand the window size should be minimized in order to decrease the network delay and improve the response time. FIG. 15 illustrates the algorithm to determine the window size. There are two windows; the second is twice as big as the first. Integrals of local time stamp (at the receiver side) are calculated on the base of both windows. Each integral is divided by the duration of the interval (window), i.e. expected delta time (T or 2T). From each result, the PDV of the first sample is subtracted; then the ratio of the two results is calculated. If the resulting ratio is smaller than 1.5, then the window size should be increased. If the ratio is greater than 2.5, then the size of the window should be decreased. For practical reasons the window size is limited by minimum and maximum size.

Figure 16:
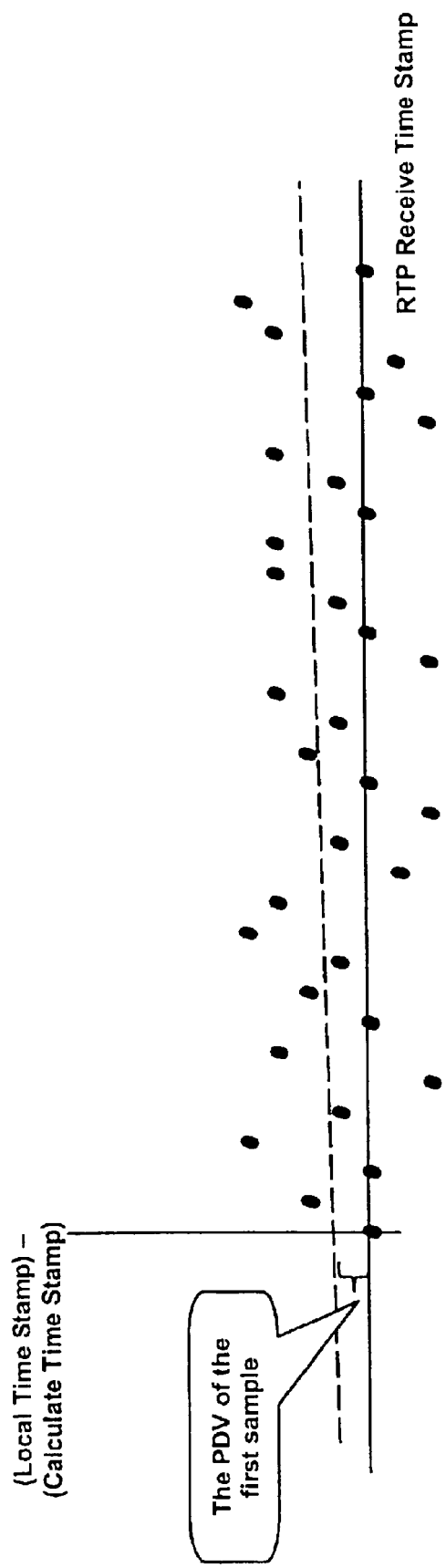
FIG. 16 illustrates the measured time stamps with calculated time stamps (where Drift <<PDV).
Figure 17:
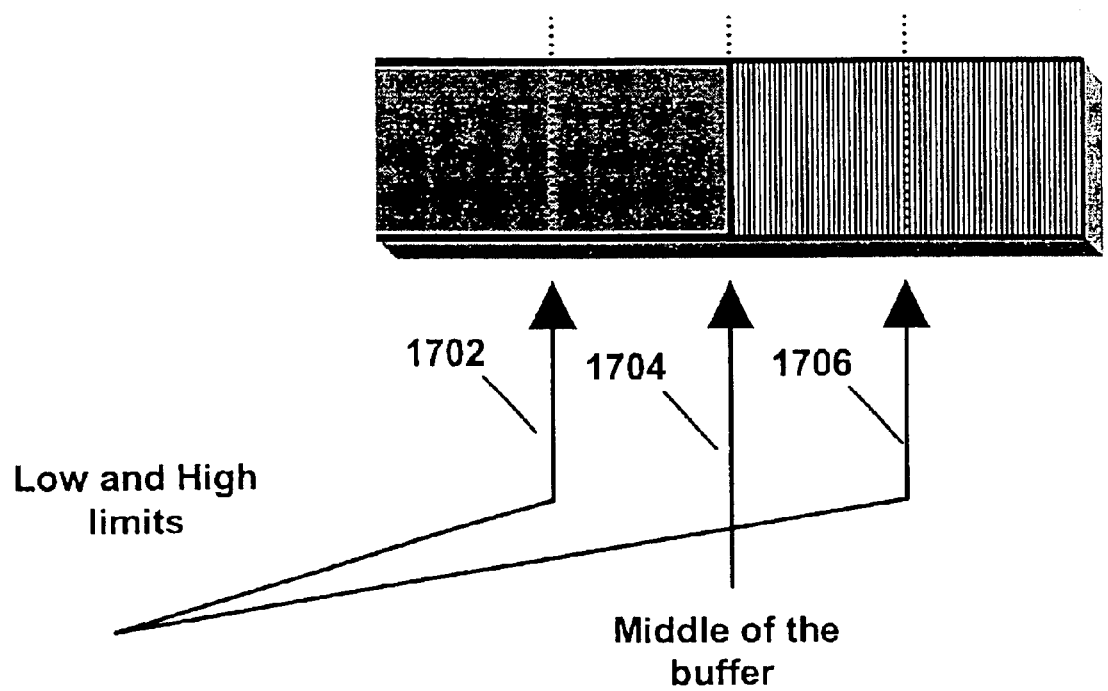
FIG. 17 illustrates various buffer positions.

If the window reaches the maximum size, but the estimated ratio is still less than 1.5, then the window based linear regression function (see FIG. 16) is not effective. To perform final accurate adjustment, the algorithm (in FIG. 13) based on the position of the data in the jitter buffer is activated. The recover clock function measures the buffer position 1308 every time new data (from RTP packet 1302) is inserted into the buffer. The average buffer position 1308 is calculated when the maximum window size is reached. In normal operation, the average position will be around the middle of the buffer. As further illustrated in FIG. 17, if the average buffer position goes over the high 1706 or under the low 1702, buffer limits clock correction 1310 is done on the local clock 1312 to return the data position back to the middle of the buffer 1704.

Figure 18A:
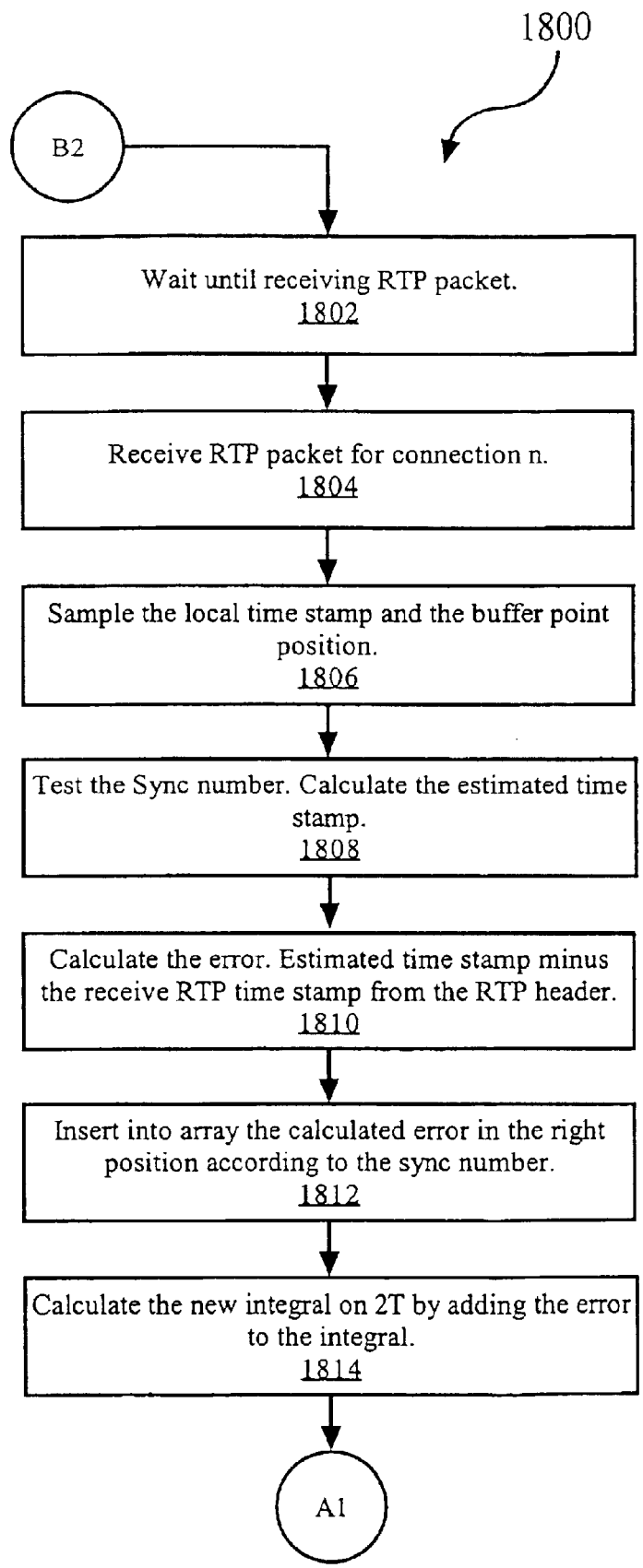
FIGS. 18a and 18b illustrate the clock recovery algorithm.
Figure 18B:
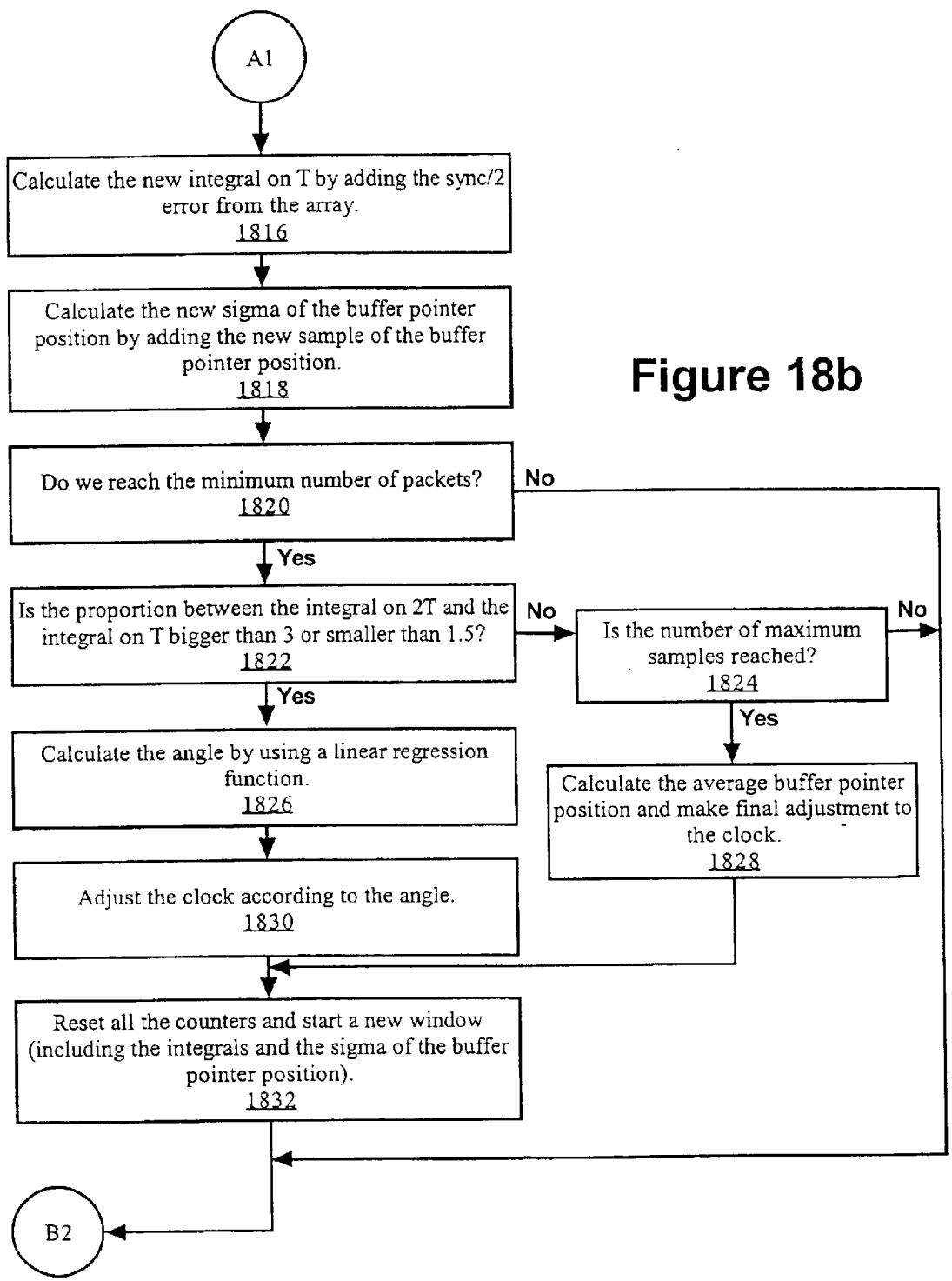

FIGS. 18a and b collectively illustrate the implementation of the clock recovery algorithm 1800. First, the algorithm waits until it receives a RTP packet 1802 and after receiving the packet 1804, the algorithm samples the local time stamp and the buffer pointer position 1806. Next, the sync number is tested and the estimated time stamp is calculated 1808. Following step 1808, the algorithm calculates the associated error by:

Error=Estimated Time Stamp–RTP Time Stamp.

The RTP time stamp in the above equation is extracted from the RTP header.

Next, the calculated error is inserted into the array, in the right position according to the right sync number. The algorithm further calculates the new integral on 2T (as described in FIG. 15) 1814 by adding the error to the integral. Similarly, in step 1816, the algorithm calculates the new integral on T by adding the sync/2 error from the array described above. After step 1816, the new sigma of the buffer pointer position is calculated 1818 by adding the new sample of the buffer pointer position. In step 1820, the algorithm checks to see if the minimum number of packets is reached. If the minimum number of packets is not reached, the algorithm returns to step 1802. Otherwise, it continues on to step 1822 to dose the proportion between the integral on 2T and T, and judges if this result is between 3 and 1.5. If the result is between 1.5 and 3 and if at this point the number of maximum samples is reached 1824, then the average buffer position is calculated 1828, the counters are reset 1832, a new window is started, and the algorithm returns to step 1802. If the maximum samples are not reached 1824, then the algorithm returns to step 1802. If the result in 1822 is smaller than 1.5 or bigger than 3, the algorithm calculates the angle 1826 by using linear regression fitting (as shown in FIG. 14) and the clock is accordingly adjusted 1830. Next, the counters are reset and a new window is started 1832 and the algorithm returns to step 1802.

The above descriptions of the method to enable circuit emulation services over IP and its described functional elements are implemented in various computing environments. For example, the present invention may be implemented on a conventional IBM PC or equivalent, multi-nodal system (e.g. LAN) or networking system (e.g. Internet, WWW, wireless web). All programming and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of network communications.

CONCLUSION

A system and method has been shown in the above embodiments for the effective implementation of circuit emulation service over IP. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or the location of the implemented circuit emulation over IP function.

What is claimed is:

1. A computer-based communication system implementing circuit emulation service (CE) over an Internet Protocol (IP) network (CES over IP, CESOIP), said system comprising:
    a circuit-data-receiver to receive circuit data from a virtual container or VC-12 (SDH);
    a SDH framer;
    a High Order Path Adaptation function; and
    a CE-to-IP function comprising;
        a packetizer to pack said circuit data into data packets;
        an encapsulator to encapsulate said data packets with headers; and
        a layer-2 incorporator to add layer-2 operations,
    wherein said packetizer further including a packet transmit function that generates no packets when a loss of pointer is detected.

2. A computer-based communication system implementing circuit emulation service (CE) over an Internet Protocol (IP) network (CES over IP, CESOIP), said system comprising:
    a circuit-data-receiver to receive circuit data from a virtual container or VC-12 (SDH;
    a SDH framer;
    a High Order Path Adaptation (HPA) function; and
    a CE-to-IP function further comprising:
        a packetizer to pack said circuit data into data packets;
        an encapsulator to encapsulate said data packets with headers; and
        a layer-2 incorporator to add layer-2 operations,
    wherein said packetizer further includes a packet transmit function that generates a special control packet when the HPA generates an error.

3. The computer-based communication system as per claim 2, wherein said packetizer further includes a packet transmit function that ignores HPA indications and transfers all data transparently.

4. A computer-based communication system implementing circuit emulation service (CE) over an Internet Protocol (IP) network (CES over IP, CESOIP) said system comprising:
    a circuit-data-receiver to receive circuit data;
    a CE-to-IP function further comprising:

a packetizer to pack said circuit data into data packets;

an encapsulator to encapsulate said data packets with headers; and a layer-2 incorporator to add layer-2 operations; and a clock-recoverer further comprising:

a receiver which receives the RTP packet;

a sampler which samples a local time stamp and a buffer pointer position;

a time-stamp-estimator which tests the sync number and calculates the estimated time stamp;

an error-calculator which calculates the error;

an inserter that inserts into array said calculated error in the right sync position according to right sync number;

a 2T-integral-calculator which calculates the new integral on 2T by adding the error to the integral;

a T-integral-calculator which calculates the new in integral on T by adding half of said error from said array;

a minimum-packet-comparator which maintains a continuous flow of RTP packets if minimum number of packets are reached;

a ratio-calculator that calculates the ratio of said integral on 2T and said integral on T;

a ratio-range-checker that checks to see if said ratio is between 1.5 and 3;

an angle-calculator which calculates the angle using linear regression;

a clock adjuster which adjusts clock according to said angle, and a resetter which resets all counters, starts new windows, and start receiving RTP packets.

5. A computer-based method implementing circuit emulation service (CE) over an Internet Protocol (IP) network (CES over IP, CESOIP), comprising the steps of:

receiving circuit data;

passing said circuit data through a CE-to-IP function, further comprising the steps of:
  packing data into data packets;
  encapsulating said data packets with headers; and
  incorporating said data packets with layer-2 headers;

transmitting said encapsulated and layer-2 incorporated data packets via a IP network; and passing the data packets through a clock recovery function further comprising the
  receiving the RTP packet;
  sampling a local time stamp and a buffer pointer position;
  testing the sync number and calculating the estimated time stamp;
  calculating the error;
  inserting into array said calculated error in the right sync position according to right sync number;
  calculating the new integral on 2T by adding the error to the integral;
  calculating the new integral on T by adding half of said error from said array;
  receiving RTP packets again if minimum number of packets are reached;
  calculating the ratio of integral on 2T and the integral on T;
  checking to see if said ratio is between 1.5 and 3;
  calculating the angle by using linear regression;
  adjusting clock according to said angle, and
  resenting all counters, st new windows, and start receiving RTP packets.

* * * * *

UNITED STATES PATENT AND TRADEMARK OFFICE
CERTIFICATE OF CORRECTION

PATENT NO. : 6,898,213 B1
DATED : May 24, 2005
INVENTOR(S) : Shimelmitz et al.

It is certified that error appears in the above-identified patent and that said Letters Patent is hereby corrected as shown below:

Title page,
Item [73], Assignee, should read as follows:
-- Axerra Networks, LTD., Tel Aviv (IL) --.

Signed and Sealed this

Eighth Day of November, 2005

JON W. DUDAS
*Director of the United States Patent and Trademark Office*